United States Patent

Pohl et al.

[11] 4,214,819
[45] Jul. 29, 1980

[54] ELECTRO-OPTICAL MODULATOR

[75] Inventors: Ludwig Pohl, Darmstadt; Rudolf Eidenschink, Dieburg; Joachim Krause, Darmstadt-Eberstadt; Georg Weber, Erzhausen, all of Fed. Rep. of Germany

[73] Assignee: Merck Patent Gesellschaft mit beschränkter Haftung, Darmstadt, Fed. Rep. of Germany

[21] Appl. No.: 955,288

[22] Filed: Oct. 27, 1978

[30] Foreign Application Priority Data

Oct. 29, 1977 [DE] Fed. Rep. of Germany ....... 2748738

[51] Int. Cl.² .............................................. G02F 1/13
[52] U.S. Cl. .................................. 350/334; 350/330; 252/299
[58] Field of Search ............... 252/299; 350/330, 331, 350/334, 346, 350

[56] References Cited
U.S. PATENT DOCUMENTS 3,364,433 1/1968 Freund et al. ...................... 350/330
4,066,334 1/1978 Fray et al. ...................... 350/330 X

*Primary Examiner*—Edward S. Bauer
*Attorney, Agent, or Firm*—Millen & White

[57] ABSTRACT

The optically active medium of an electro-optical cell sandwiched between a pair of crossed polarizers is a thin layer of liquid crystal with a positive dielectric anisotropy and a negative anisotropy of the diamagnetic susceptibility. The medium is positioned between two planar transparent electrodes across which a potential difference establishes, in the liquid crystal layer, an electric field perpendicular to the electrode layers. A magnet is provided for establishing in the medium a magnetic field that has a predetermined orientation relative to the electric field. When both fields are parallel, the threshold voltage of the cell is increased. The presence of such a magnetic field, when the electric field is switched off, reduces the turn-off time of the cell. When the fields are perpendicular to each other, the color of the display can be controlled in accordance with the magnitude of the magnetic field.

13 Claims, 5 Drawing Figures

ELECTRO-OPTICAL MODULATOR

BACKGROUND OF THE INVENTION

The invention relates to an electro-optical modulator based on a liquid crystal cell, which can be actively switched on and off with the aid of electric pulses.

In conventional electro-optical modulators based on liquid crystal cells, electric fields applied to nematic or nematic-cholesteric materials significantly influence their optical properties, such as light scattering, reflectance, birefringence or color. In particular, such modulators have become very important wherein the liquid crystal materials employed have a positive dielectric anisotropy (positive DKA), and the molecules of such liquid crystals, in the field-free state, are oriented with their longitudinal axes parallel to the electrode surface. Whenever the direction of that orientation is different at the opposite electrode surfaces, the axes of the liquid crystal molecules twist from one electrode surface to the other through a certain angle, preferably 90°. Such twisted nematic cells are widely used for display elements of digital clocks or electronic computers.

The versatility of modulators of this type would be increased if it were possible to adjust the orientation of the liquid crystal molecules at will with respect to the electrode surfaces between the limiting values of being parallel or perpendicular to such surfaces. This would allow to vary the threshold voltage in the case of a given liquid crystall material to thereby reduce switching times.

For example, the number of the interference colors which appear when using the Freedericksz effect or the effect of the deformation of aligned phases (DAP effect), can be influenced by a freely selectable orientation of the molecules. These effects play an important part in the design of colored liquid crystal displays. If more than two orders of interference colors appear, pure color shades can be achieved only with difficulty in the case of liquid crystal display elements which operate on this basis. Therefore, mixtures of liquid crystal materials with dichroitic dyestuffs have hitherto been used predominantly for so-called color switches, although the liquid-crystalline properties of the base materials are as a rule adversely affected by added dyestuffs.

Were it possible to vary the threshold voltage, the operating voltage across a liquid crystal cell could be varied. Furthermore, if it were possible to influence the threshold voltage at discrete points of a display element in different ways, the display contrast in a liquid crystal cell could be improved markedly.

Finally, if it were possible to shorten the switching times, the number of switching steps per unit time could be increased thereby increasing the number of information items which could be transmitted through a display element.

The switching time of a liquid crystal cell is composed of the switch-on time and the switch-off time. The term "switch-on time" as used herein means that period of time between the instant of switching on the electric field and the instant at which 90% of the maximum display contrast is reached. Analogously, the switch-off time is the period of time between the instant of switching off the electric field and the instant at which the contrast ratio has decayed by 90%. Of these two components of the switching time, only the switch-on time is influenced by the level of the voltage applied. In conventional liquid crystal display elements, quite acceptable switch-on times of the order of magnitude of 1-10 milliseconds (ms) are achieved. By contrast, the switch-off time lies as a rule between 30 and 300 ms and essentially depends on the thickness of the liquid crystal layer and on the viscosity and the magnitude of the constant of elasticity of the liquid crystal material used, but it does not depend on the level of the control voltage applied.

It has already been proposed in German Auslegeschrift No. 2,450,390 to overcome this disadvantage in the design of a light barrier based on a liquid crystal cell by providing two liquid crystal cells, which can be separately triggered, one behind the other in the light beam. Both of the liquid crystal cells contain liquid crystal layers which are each twisted in themselves by 90° and are arranged, in conjunction with polarizers, in such a way that no light can pass through in the field-free state. As soon as one of these cells is activated by an electric field, the arrangement becomes transparent after the switch-on time has elapsed. By a subsequent activation of the second cell, after a second switch-on time has elapsed, the arrangement again becomes impervious to light. It is evident that such an arrangement of two liquid crystal cells is very expensive to construct and therefore has a severely limited applicability.

It is the object of the invention to provide a liquid crystal cell based electro-optical modulator which provides control over the initial orientation of the liquid crystal molecules relative to the electrode surfaces, the threshold voltage or the switch-off time, or simultaneously even two of these properties.

Another object is the provision of a novel method for regulating the switch-off times of liquid crystal cells and for improving the contrast of matrix-addressed liquid crystal cells. Other objects will be apparent to those skilled in the art to which the invention pertains.

These objects are achieved according to this invention, by a liquid crystal cell which contains a thin layer of a liquid crystal material with a positive DKA between transparent electrode base plates, each of which have one layer of an electrically conductive transparent electrode material to which an electric voltage can be applied, and in which the electrode plates are enclosed like a sandwich by polarizers, two magnets being provided, parallel or perpendicular to the surfaces of the electrode base plates, and the liquid crystal material having a negative anisotropy of the diamagnetic susceptibility (negative DMA).

SUMMARY OF THE INVENTION

According to the present invention, the optically active medium of an electro-optical cell sandwiched between a pair of crossed polarizers is a thin layer of liquid crystal with a positive DKA and a negative anisotropy of the diamagnetic susceptibility (negative DMA). The medium is positioned between two planar transparent electrode layers with which an electric field perpendicular to the electrode layers can be set up in the medium. A magnet is provided for establishing in the medium a magnetic field that has a predetermined orientation relative to the electric field. When both the electric and magnetic fields are parallel, the threshold voltage of the cell is increased. The presence of such a magnetic field when the electric field is turned off reduces the turn-off time of the cell. When the magnetic field is perpendicular to the electric field, the color of the display can be controlled in accordance with the magnitude of the magnetic field.

While the magnetic field can be established by either a permanent or an electromagnet, in a perferred embodiment of the present invention, the magnetic field is produced by transparent, planar magnetic layers, each of which is parallel to the transparent electrode layers. The respective magnetic layers can be located between a transparent electrode layer and the liquid crystal layer. Alternatively, each transparent electrode layer can be sandwiched between a respective magnetic layer and the crystal layer. In either case, the direction of the magnetic field is perpendicular to both the magnetic layers and the electrode layers. By providing conductors associated with the magnetic layers, the direction of the magnetic field can be rotated by 90° by passing an electric current through the conductors.

In the device according to the invention, the molecular orientation of the liquid crystal material having a positive DKA and a negative DMA can be influenced by the combination of an electric and a magnetic field in such a way that the angle of the longitudinal axes of the molecules relative to the electrode surfaces can be adjusted to any desired value between 0° and 90°. Furthermore, the threshold voltage will be raised and/or lowered and the switch-off time is markedly shortened compared with that of a conventional modulator.

In a preferred embodiment, the effect of actively switching off the liquid crystal cell is achieved by simultaneously switching off the electric field and effecting a 90° rotation of the magnetic field, which was previously directed parallel to the electrode plates, with the aid of a suitable control current. If the modultors according to the invention are constructed as matrix displays, it is possible, by controlled triggering of those points of the magnetic layers which are located above or below the untriggered points of the electrode layers, to prevent undesired "crosstalk" and hence markedly to improve the contrast of the display.

BRIEF DESCRIPTION OF THE DRAWINGS

Embodiments of the present invention are disclosed in the accompanying drawings wherein.

DETAILED DESCRIPTION

Figure 1:
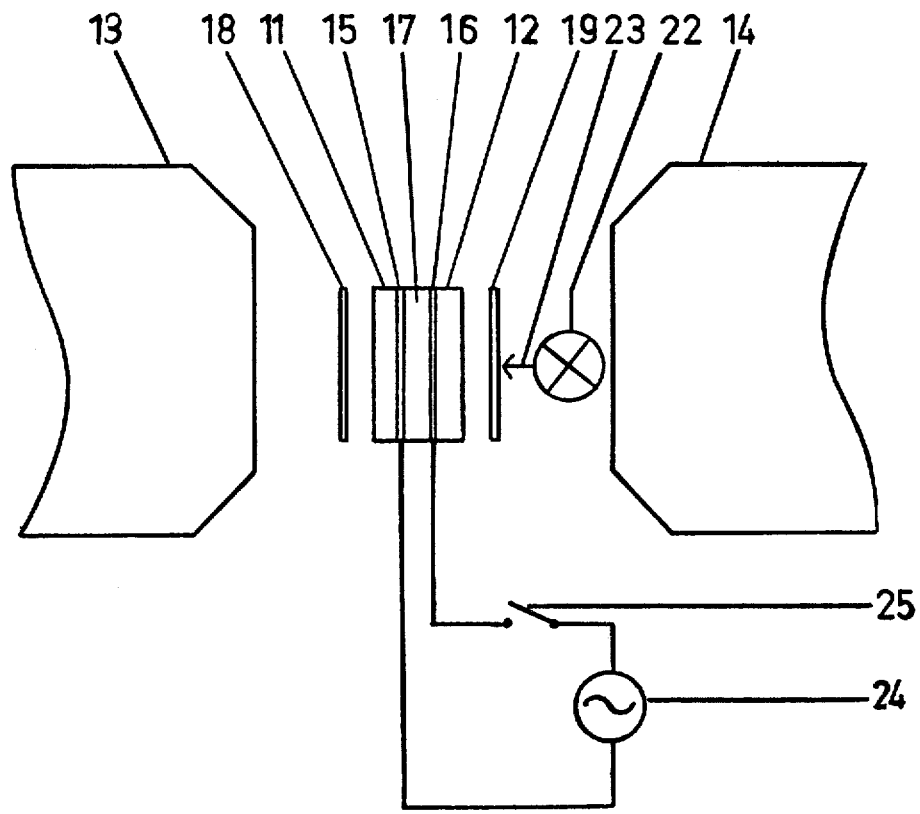
FIG. 1 diagrammatically shows a build-up of a modulator according to the invention having magnets arranged parallel to the electrode layers.
Figure 2:
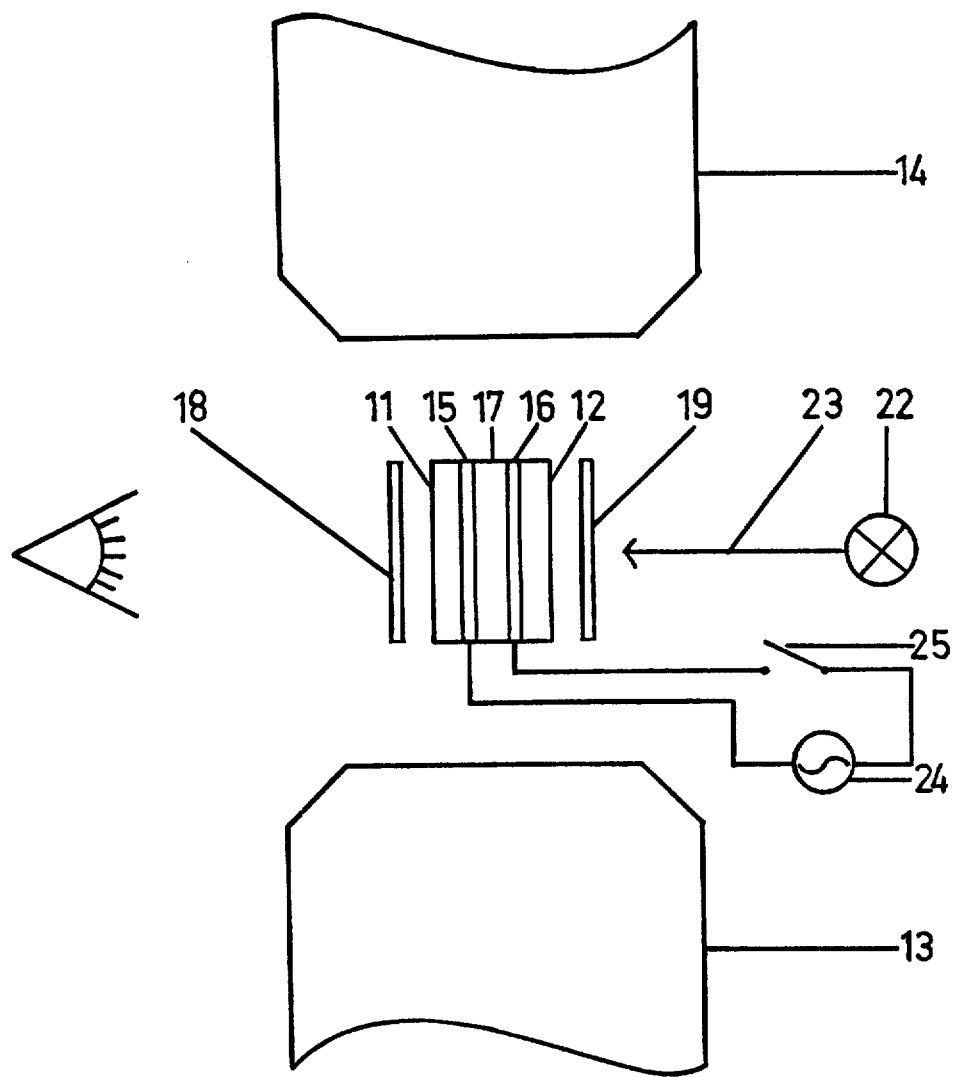
FIG. 2 diagrammatically shows a modulator according to the invention having magnets arranged perpendicular to the electrode layers.

In FIGS. 1 and 2, reference numerals 11 and 12 denote electrode base plates which are respectively coated with transparent electrode layers 15 and 16 connected to voltage source 24 by switch 25. A liquid crystal layer 17, consisting of a nematic liquid crystal material, with a positive DKA and a negative DMA, is located between the electrode layers (15, 16). The preferential orientation of the molecules of the liquid crystal material changes by 90° from one to the other of the electrode layers. Polarizers 18 and 19 are located outside plates 11 and 12 and are arranged in such a way that the plane of polarization of each polarizer is parallel to the direction of the preferential orientation of the liquid crystal molecules on the adjacent electrode layer. Thus, the polarizers are crossed.

Finally, spaced magnets 13 and 14 of different polarity are arranged with their pole faces parallel to the electrode base plates and produce as homogeneous a magnetic field as possible in a direction parallel to the direction of an electric field between the electrode layers (15, 16) arising from a potential difference thereacross.

Within the scope of the present invention, all the materials, structures, circuits and elements customary for liquid crystal cells can be used as the electrode base plates (11, 12), electrode layers (15, 16), polarizers (18, 19), light source (22), voltage source (24) and switch (25). The magnets (13, 14) are either permanent magnets or preferably electromagnets, the magnetic field strength of which is controllable as continuously as possible by adjusting the magnitude of electric current strength flowing in the windings (not shown) associated with the pole pieces.

The nematic liquid crystal material employed for the liquid crystal layer 17 can be any liquid crystal material having a positive DKA and a negative DMA. Preferred materials of this type contain at least one trans-4,4'-disubstituted cyclohexylcyclohexane derivative described in U.S. copending Application Ser. No. 868,580, filed Jan. 11, 1978, now U.S. Pat. No. 4,181,625, whose disclosure is incorporated herein by reference, viz., trans,trans-cyclohexylcyclohexanes of the formula

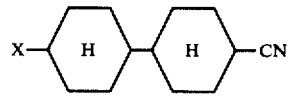

wherein X is —R, —OR or —OCOR and R is alkyl of 1–12 carbon atoms. The twisted structure of the preferential orientation of the liquid crystal layer can be brought about by known processes, for example, by the addition of optically active compounds or by a specific surface treatment of the adjacent electrode layers.

In the switched-off state, that is to say when no voltage is applied to the electrode layers (15, 16) or parts thereof and no magnetic field is present, the liquid crystal cell according to FIG. 1 is transparent to incident light 23 from light source 22. This situation arises because the vibrational plane of the light, which is polarized linearly by the polarizer 19 on entering crystal 17, follows the direction of preferential orientation of the liquid crystal molecules. The vibrational plane of the light emerging from crystal 17 is thus rotated by 90° and is parallel to the plane of polarizer 18. Consequently, the emerging light passes through this polarizer.

If a voltage, which is higher than the threshold voltage of liquid crystal layer 17, is now applied to electrodes (15, 16), the molecular longitudinal axes of the molecules of the nematic substance are rotated toward the direction of the electric field which is perpendicular to the electrodes (15, 16). The rotation destroys the twisted nature of the preferential orientation of the molecules of the crystal, and hence its optical activity disappears. As a consequence, the polarization of the light entering the crystal through polarizer (19) is no longer rotated and is thus blocked by polarizer 18; and the cell has thus become impervious to light. The duration of this process corresponds in practice to the switch-on time which is in the range of 1–50 ms in conventional devices. When the voltage is switched off, the twisted nature of the liquid crystal molecules returns during the course of the switch-off time until the cell is once more transparent.

If, in the device according to the invention, a magnetic field is established in a direction perpendicular to the electrodes (and hence parallel to the electric field), the force acting on the liquid crystal molecules because of the negative DMA of the latter acts to align the longitudinal axis of the molecules in a direction prependicular to the direction of the magnetic field and hence parallel to the electrode layers (15, 16). Thus, the magnetic field acts on the longitudinal axis of the molecules in a manner opposite to the manner in which the electric field acts.

If an electric voltage is applied to the electrode layers in the presence of a magnetic field whose direction is parallel to the direction of the electric field, the force due to the magnetic field tends to orient the axis of the liquid crystal molecules parallel to the electrode base plates. Such force is opposite to and counteracts the force due to the electric field which tends to orient the axis of the molecules perpendicular to the electrode base plates. A stronger electric field is therefore necessary to orient the axes of the crystal molecules in the direction of the electric field. That is to say, the threshold voltage of the liquid crystal layer (17) is increased by reason of the presence of a magnetic field in the same direction as the electric field. Although in principle this effect tends to increase the turn-on time of the cell, this can be neglected because this increase is compensated by the decrease resulting from the increased driving voltage, which necessarily follows the increased threshold voltage.

Figure 4:
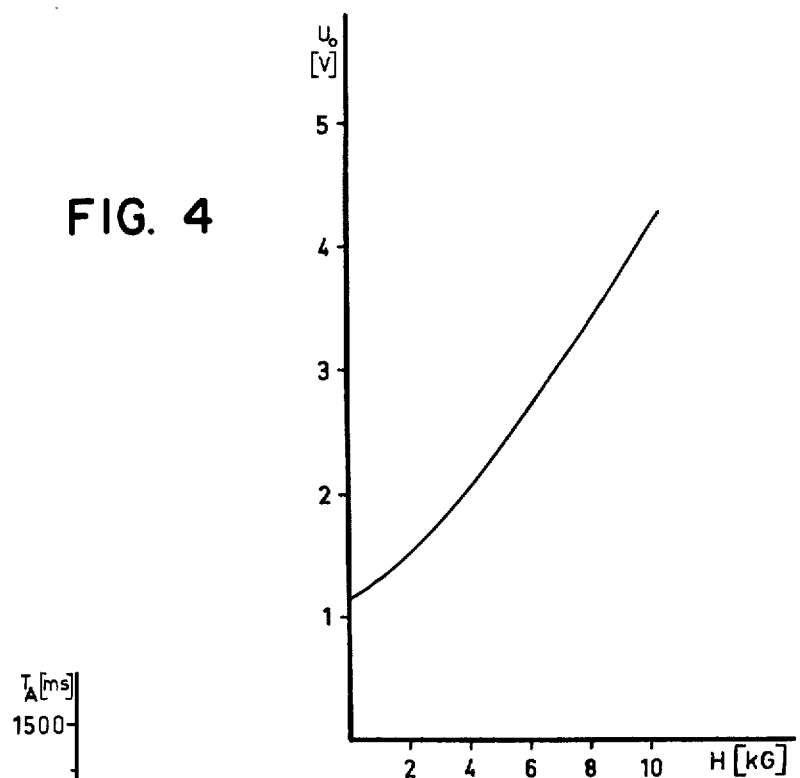
FIG. 4 and FIG. 5 illustrate the influence of the magnetic field on the threshold voltage and switch-off time.

FIG. 4 is a graphical illustration of the influence of the strength of the applied magnetic field on the threshold voltage. In this figure, the magnetic field strength H in kilogauss (kG) is plotted as the abscissa and the threshold voltage $U_o$ in volts (V) is plotted as the ordinate. The values were determined at room temperature in a cell having a $40\mu$ thick nematic liquid crystal layer, twisted by 90° and consisting of 50% of trans-4-[trans-4'-n-pentylcyclohexyl-(1')]-cyclohexane-(1)-carbonitrile, 40% of trans-4-[trans-4'-n-heptylcyclohexyl-(1)]-cyclohexane-(1)-carbonitrile and 10% of trans-4-n-pentyl-1-(4'-cyanophenyl)-cyclohexane (DKA=+4; DMA=$-2 \cdot 10^{-8}$ cm$^3$/g). It can be seen from FIG. 4 that the threshold voltage is doubled by the presence of a magnetic field of 5 kG.

In the arrangement shown in FIG. 1, (i.e., with mutually parallel electric and magnetic fields) switching off the voltage on the transparent electrodes eliminates the electric field. The return of the liquid crystal molecules from their orientation in the direction of the electric field to their original (i.e., twisted) orientation parallel to the delimiting electrodes is accelerated by the presence of the magnetic field. In this way the switch-off time is shortened, the degree of shortening depending on the strength of the magnetic field and the magnitude of the negative DMA. Of course, the same effect will be achieved if an electromagnet were used and the magnetic field is only switched on at the instant at which the voltage on the electrodes is switched off. In this manner, the device according to the invention represents an electro-optical modulator which is based on a liquid crystal cell and which can be actively switched on and off by electric pulses.

Figure 5:
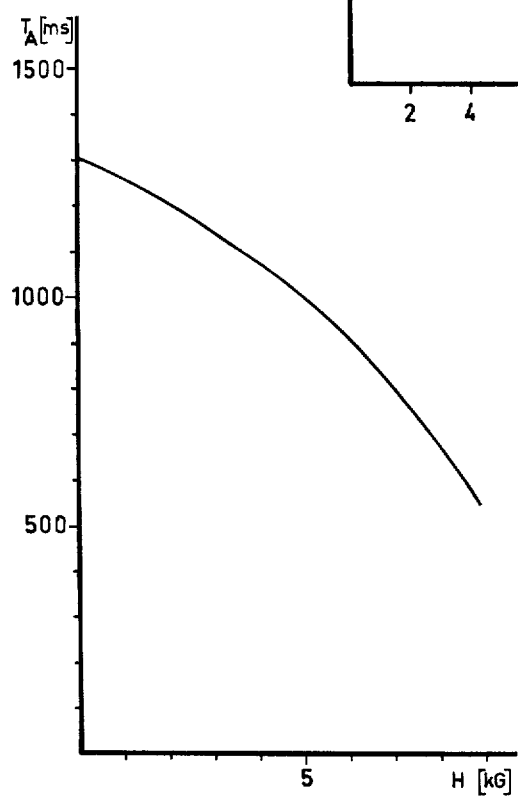

FIG. 5 shows a graphical illustration of the influence of a magnetic field on the switch-off time. The magnetic field strength H in kG is again plotted as the abscissa and the switch-off time $T_A$ in milliseconds [ms] is plotted as the ordinate. A cell having a $40\mu$ thick liquid crystal layer of the composition indicated above was again used. It can be seen from this experimental arrangement that the switch-off time can be shortened by about 25% by means of a magnetic field of about 5 kG, and that it can be shortened by 50% by means of a magnetic field of about 8 kG.

When an electric voltage on the electrodes of FIG. 2 exceeding the threshold voltage is switched on and off, the mode of operation of the device according to FIG. 2, in the presence of a magnetic field, corresponds exactly to the mode of operation described for the device according to FIG. 1 in the absence of a magnetic field. When a magnetic field which is parallel to the electrode layers, and hence perpendicular to an electric field which can be established, is now applied to the device according to FIG. 2 with the voltage off, a force acts on the liquid crystal molecules because of their negative DMA. The force pulls the longitudinal axes of the molecules into a direction perpendicular to the direction of the magnetic field and hence to the electrode surfaces. Consequently, the forces due to the magnetic field act to align the axes of the molecules in the direction perpendicular to that which the surface forces of the electrode layer would give to the molecules in a (magnetic) field-free state. The liquid crystal molecules of the entire layer are thus oriented in the direction of the resultant of the surface force and the rotating force originating from the magnetic field, while retaining the twisted structure. By varying the magnetic vield strength, the direction of the resultant and hence the molecular orientation in the liquid crystal layer can be freely selected over a wide range. In addition to the important result of producing colored liquid crystal displays, the presence of a magnetic field also influences the threshold voltage, i.e., it becomes lower as the magnetic field strength increases.

Figure 3:
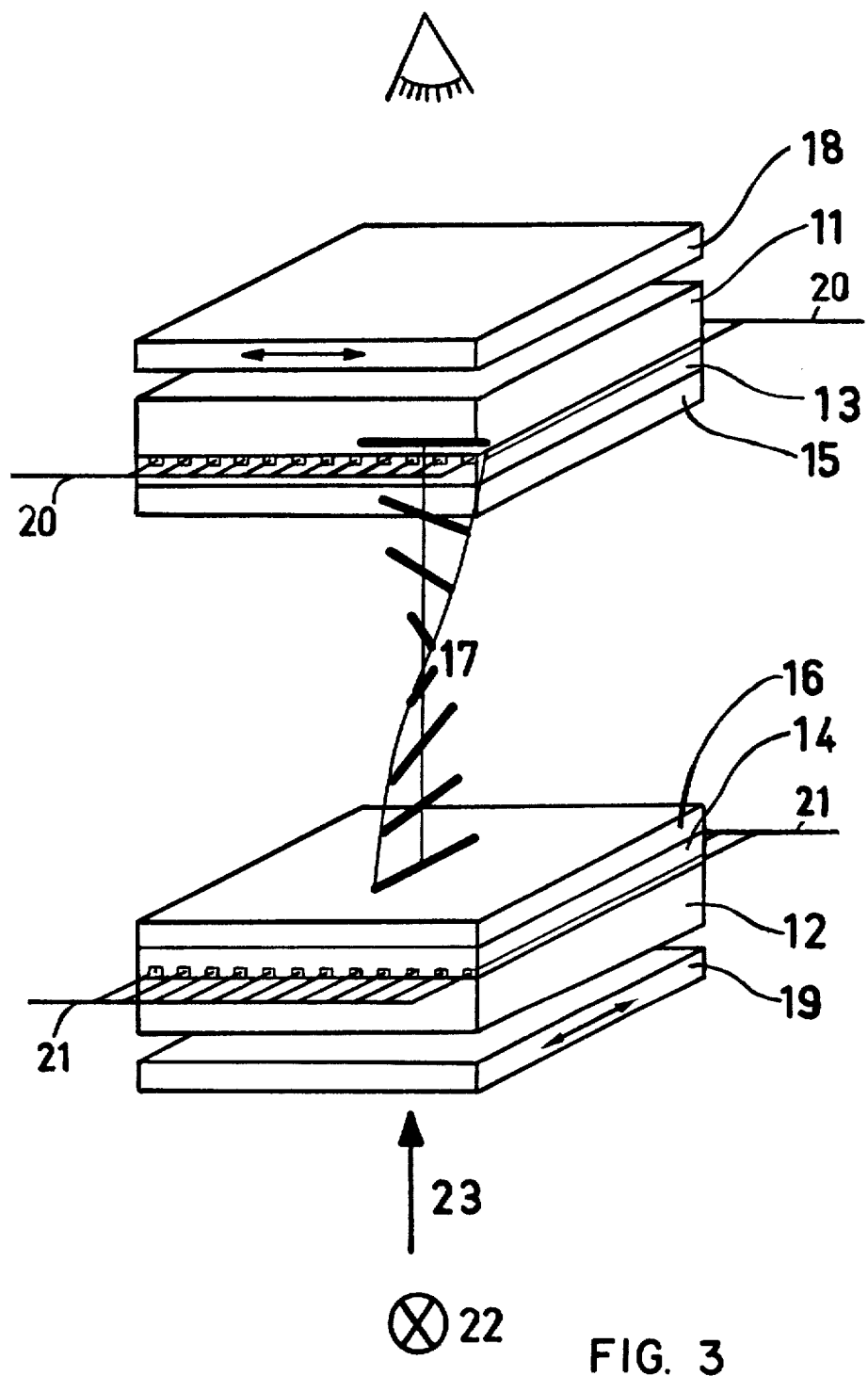
FIG. 3 shows a preferred embodiment of the modulator according to the invention, having transparent magnetic layers parallel to the transparent electrode layers in order to produce a magnetic field whose direction can be rotated by means of electric pulses.

FIG. 3 shows a preferred embodiment of the electro-optical modulator according to the invention, having magnets arranged parallel to the electrode layers.

In FIG. 3, reference numerals 11 and 12 again denote the electrode base plates which respectively are each coated with a transparent magnetic layer 13 and 14. Over these magnetic layers, respective transparent electrode layers 15 and 16 are deposited. The order of these two layers is not essential according to the invention in this embodiment. That is to say, electrode layers (15 and 16, drawn without supply leads for the sake of clarity) can be applied first to the electrode base plates 11 and 12, and the magnetic layers (13 and 14) can be applied thereafter. Below the magnetic layers, electric conductor paths 20 and 21 are provided which make it possible to rotate the magnetic field of the magnetic layer by 90° with the aid of control currents flowing in the conductor paths. Between the coated electrode base plates (11, 13, 15 and 12, 14, 16), is a liquid crystal layer 17 which consists of a nematic liquid crystal material having a positive DKA and a negative DMA. The preferential orientation of the molecules of the liquid crystal material changes by 90° from one to the other of the delimiting layers (magnetic layers or electrode layers). Finally, behind the electrode base plates, as viewed from the liquid crystal layer, the polarizers 18 and 19 are arranged in such a way that the plane of polarization of each polarizer is parallel to the direction of the preferential orientation of the liquid crystal molecules on the adjacent electrode layer or magnetic layer.

In this preferred embodiment also, all the customary structures and materials for liquid crystal cells can be used as the electrode base plates (11, 12), electrode layers (15, 16) and polarizers (18, 19). For example, the magnetic layers can consist of vapor-deposited permalloy or yttrium iron garnet or of other materials which are conventional in the electronics industry for the production of magnetic layers.

This preferred embodiment according to FIG. 3 is perferably used in matrix displays in which each "indicator point" of an electrode screen can be triggered selectively by applying a voltage to one horizontal conductor row selected from a multiplicity of parallel horizontal conductor rows forming together the first electrode layer, and to one vertical conductor column selected from a multiplicity of parallel vertical conductor columns forming together the second electrode layer. A disadvantage of these matrix displays is the production of partial activation (called "crosstalk") of indicator points in the immediate vicinity of a triggered indicator point, which reduces the contrast of the display in an undesirable manner. If, in the device according to the invention as shown in FIG. 3, the magnetic layers (13, 14) consist in an analogous manner of a multiplicity of "magnetic field points", each of which corresponds to a single "indicator point" and can be triggered individually, it is possible, by a selective triggering of those magnetic field points corresponding to indicator points adjacent to the triggered electrode indicator point, to increase the threshold voltage on those adjacent indicator points of the electrode screen, which have not been triggered, to such an extent that crosstalk is prevented, and thus an improved contrast is achieved. An increase in the threshold voltage by 10–20%, which is shown in FIG. 4, can be achieved, for example, by applying magnetic field strengths of 0.8–1.5 kG., which will usually be sufficient.

With the aid of the electro-optical modulator according to the invention, manifold advantageous effects can be achieved by means of a large number of modifications which are well-known to those skilled in the art. Thus, display elements for calculators or clocks can be manufactured from the modulators according to the invention. Further fields of application are television technology, electronic data processing and the construction of cameras.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An electro-optical modulator comprising:
   (a) a liquid crystal cell having a thin layer of liquid crystal material with a positive DKA and a negative DMA positioned between two transparent electrode layers across which a potential difference establishes in the liquid crystal layer an electric field perpendicular to the electrode layers;
   (b) crossed polarizers sandwiching the cell; and
   (c) means for establishing a magnetic field in the liquid crystal layer having a predetermined direction relative to the direction of the electric field.

2. An electro-optical modulator according to claim 1 wherein the magnetic field is parallel to the electric field.

3. An electro-optical modulator according to claim 1 wherein the magnetic field is perpendicular to the electric field.

4. An electro-optical modulator according to claim 1 wherein the magnetic field is produced by a permanent magnet.

5. An electro-optical modulator according to claim 1 wherein the magnetic field is produced by an electromagnet whose field strength can be varied.

6. An electro-optical modulator according to claim 2 wherein the magnetic field is produced by two transparent magnetic layers, each of which is located between a respective one of the transparent electrode layers and the liquid crystal layer, the magnetic field being perpendicular to both the magnetic layers and the electrode layers.

7. An electro-optical modulator according to claim 2 wherein the magnetic field is produced by two transparent magnetic layers, each of which cooperates with the crystal layer and sandwiches a respective one of the transparent electrode layers, the magnetic field being perpendicular to both the magnetic layers and the electrode layers.

8. An electro-optical modulator according to claim 6 wherein each of the magnetic layers is provided with electric conductor paths, the flow of control current through such conductor paths serving to rotate the direction of the magnetic field by 90°.

9. An electro-optical modulator according to claim 7 wherein each of the magnetic layers is provided with electric conductor paths, the flow of control current through such conductor paths serving to rotate the direction of the magnetic field by 90°.

10. An electro-optical modulator according to claim 1, wherein the liquid crystal contains at least one trans,-transcyclohexylcyclohexane of the formula

wherein X is —R, —OR or —OCOR and R is alkyl of 1–12 carbon atoms.

11. A display element adapted for use in calculators, clocks, television sets or electronic data-processing units comprising an electro-optical modulator according to claim 1.

12. A method for reducing the turn-off time of a positive DKA liquid crystal cell in which a layer of liquid crystal material is sandwiched between transparent electrodes by which an electrical field can be established in the liquid crystal material to switch the cell to its display mode, which comprises employing a liquid crystal material having a negative DMA and establishing a magnetic field parallel to the electric field therein during at least a portion of the turn-off time.

13. A method for improving the contrast by reducing undesired "crosstalk" of a matrix-addressed liquid crystal display in which a layer of positive DKA liquid crystal material is sandwiched between transparent electrodes, consisting of a multiplicity of parallel horizontal conductor rows, and a multiplicity of parallel vertical conductor columns, respectively, by which the liquid crystal material at the crosspoint of any horizontal row with any vertical column can be separately triggered to its display mode, which comprises employing a liquid crystal material having negative DMA, and establishing at the adjacent untriggered crosspoints a magnetic field parallel to the electric field established at said triggered crosspoint.

* * * * *